(12) United States Patent
Stewart et al.

(10) Patent No.: US 9,925,623 B2
(45) Date of Patent: Mar. 27, 2018

(54) CASE ASSEMBLY AND METHOD

(71) Applicant: United Technologies Corporation, Hartford, CT (US)

(72) Inventors: Dana P. Stewart, Vernon, CT (US); Edward R. Szela, West Springfield, MA (US); John H. Finn, Northford, CT (US)

(73) Assignee: United Technologies Corporation, Hartford, CT (US)

(*) Notice: Subject to any disclaimer, the term of this patent is extended or adjusted under 35 U.S.C. 154(b) by 1270 days.

(21) Appl. No.: 13/631,321

(22) Filed: Sep. 28, 2012

(65) Prior Publication Data

US 2014/0093372 A1 Apr. 3, 2014

(51) Int. Cl.

| | | |
|---|---|---|
| *B23K 1/008* | (2006.01) | |
| *B23K 31/02* | (2006.01) | |
| *F01D 9/04* | (2006.01) | |
| *B23K 1/00* | (2006.01) | |
| *B23K 9/007* | (2006.01) | |
| *B23K 37/04* | (2006.01) | |
| *F01D 25/24* | (2006.01) | |
| *B23K 101/00* | (2006.01) | |

(52) U.S. Cl.
CPC .............. *B23K 31/02* (2013.01); *B23K 1/008* (2013.01); *B23K 1/0018* (2013.01); *B23K 9/007* (2013.01); *B23K 37/0443* (2013.01); *F01D 9/04* (2013.01); *B23K 2201/001* (2013.01); *F01D 25/24* (2013.01); *F05D 2230/237* (2013.01); *Y10T 29/49771* (2015.01); *Y10T 29/49968* (2015.01)

(58) Field of Classification Search
CPC ...... B23K 1/0018; B23K 1/008; B23K 26/24; B23K 26/244; B23K 37/0443; B23K 9/007; B23K 2201/001; B23K 31/02; F01D 9/04; F02C 7/20
See application file for complete search history.

(56) References Cited

U.S. PATENT DOCUMENTS

| | | | |
|---|---|---|---|
| 4,747,750 A | 5/1988 | Chlus et al. | |
| 5,211,536 A | 5/1993 | Ackerman et al. | |
| 5,218,816 A | 6/1993 | Plemmons et al. | |
| 5,786,559 A * | 7/1998 | Ottino ................. | B23K 1/0056 219/121.64 |
| 6,186,867 B1 | 2/2001 | Dwyer | |
| 6,287,182 B1 | 9/2001 | Dwyer | |
| 7,857,576 B2 | 12/2010 | Durocher et al. | |
| 7,909,570 B2 | 3/2011 | Durocher et al. | |
| 8,061,969 B2 | 11/2011 | Durocher et al. | |
| 2003/0115886 A1* | 6/2003 | Farmer ................ | B23K 26/244 60/804 |
| 2009/0274562 A1* | 11/2009 | Minor ..................... | F01D 5/288 416/241 R |
| 2010/0051594 A1 | 3/2010 | Gero et al. | |
| 2010/0132369 A1 | 6/2010 | Durocher et al. | |
| 2011/0081228 A1 | 4/2011 | Durocher et al. | |
| 2011/0081237 A1 | 4/2011 | Durocher et al. | |
| 2011/0214433 A1* | 9/2011 | Feindel ................ | F01D 25/162 60/796 |
| 2012/0000967 A1 | 1/2012 | Bischof et al. | |

* cited by examiner

*Primary Examiner* — Woody Lee, Jr.
*Assistant Examiner* — Maxime Adjagbe
(74) *Attorney, Agent, or Firm* — Kinney & Lange, P.A.

(57) ABSTRACT

A case assembly includes a plurality of segments, at least one braze joint, and one or more welds. The braze joint connects the plurality of segments together and the one or more welds extend across adjacent segments.

14 Claims, 13 Drawing Sheets

CASE ASSEMBLY AND METHOD

BACKGROUND

The described subject matter relates generally to gas turbine engines and more particularly, to an assembly and method of forming a portion of a case in gas turbine engines.

Compact engines require closer packing of components, which in turn requires more crossing of hot and cold gas flows. Without adequate thermal protection, seals, and insulation between these flows, smaller engines suffer from a loss of efficiency. One system developed for certain engines is the mid-turbine frame (MTF), also known as the turbine center frame (TCF) or interturbine frame. This can be disposed between intermediate stages of the turbine section and can have numerous components serving a variety of functions, including bearing support, engine backbone, combustion gas flow path, among others.

Many turbine engine components are secured together with brazing operations. Excess amounts of brazing alloy can be problematic if the brazing alloy flows into critical areas such as flow paths during the brazing operation.

This may result in the need to recycle or scrap components. Additionally, obtaining and having sufficient braze to achieve a desired braze thickness between components can be difficult to achieve.

SUMMARY

A case assembly includes a plurality of segments, at least one braze joint, and one or more welds. The braze joint connects the plurality of segments together and the one or more welds extend across adjacent segments.

A method of assembling a case of a gas turbine engine includes assembling a plurality of segments, where each of the segments separated from an adjacent segment by a gap. The method applies a weld between segments across the gap and applies a braze material to the gap.

A fixture includes a base, a plurality of clamps, a plurality of legs, and one or more rods. The base has an arcuate channel therein and the clamps extend from the base around the channel. The legs extend from the base and are spaced at a distance from the clamps. The one or more rods are mounted to the legs.

DETAILED DESCRIPTION

The invention relates to a case assembly and process for assembling a case of a gas turbine engine. In particular, the invention described allows for a substantially uniform case assembly to be readily formed prior to brazing operations, thereby reducing the time, complexity, and cost of performing the brazing operations during manufacturing. The case assembly utilizes liner segments that are disposed adjacent one another. Initially, each of the liner segments is separated from adjacent liner segments by gaps to either circumferential side. Each gap between the adjacent liner segments has a substantially similar circumferential spaced distance "gap width", which allows braze to be applied with substantially the same width for each joint. Because the joints have a substantially similar circumferential spaced distance, the joints and liner segments have similar thermal growth and strength properties. Additionally, the invention simplifies the assembly process by utilizing welds to temporarily hold the assembled liner segments together at the joints to maintain the gap widths prior to brazing.

Figure 1:
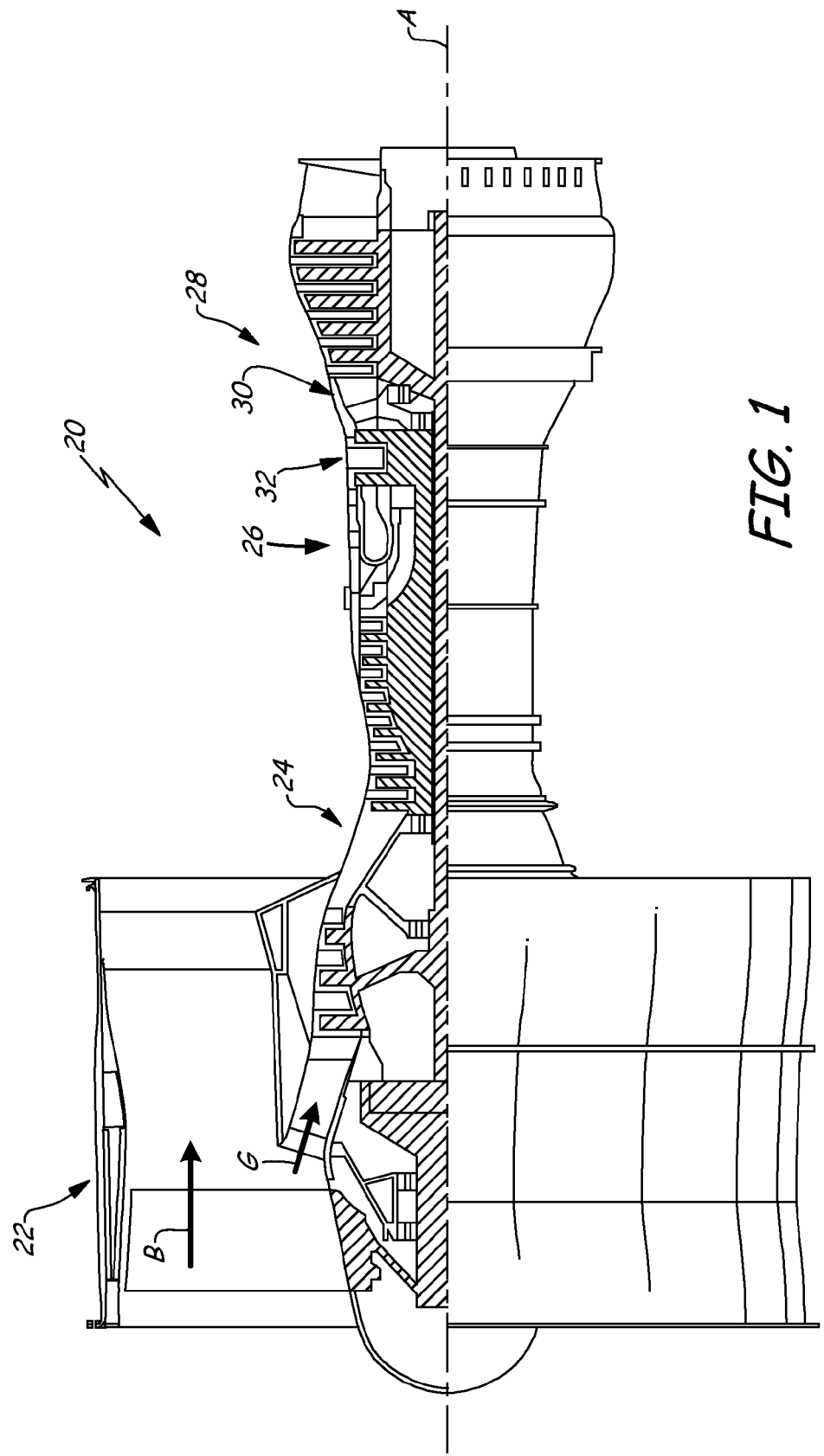
FIG. 1 is a schematic cross-sectional view of a turbofan gas turbine engine.

FIG. 1 schematically illustrates an example gas turbine engine 20 that includes fan section 22, compressor section 24, combustor section 26 and turbine section 28. Fan section 22 drives air along bypass flow path B while compressor section 24 draws air in along core flow path G where air is compressed and communicated to combustor section 26. In combustor section 26, air is mixed with fuel and ignited to generate a high pressure exhaust gas stream that expands through turbine section 28, where energy is extracted and utilized to drive fan section 22 and compressor section 24.

A mid-turbine frame (MTF) 30 is arranged generally between high pressure turbine 32 and low pressure turbine 34 of turbine section 28. Mid-turbine frame 30 is a static structure that further supports bearings in turbine section 28 as well as setting airflow entering low pressure turbine 34.

Figure 2:
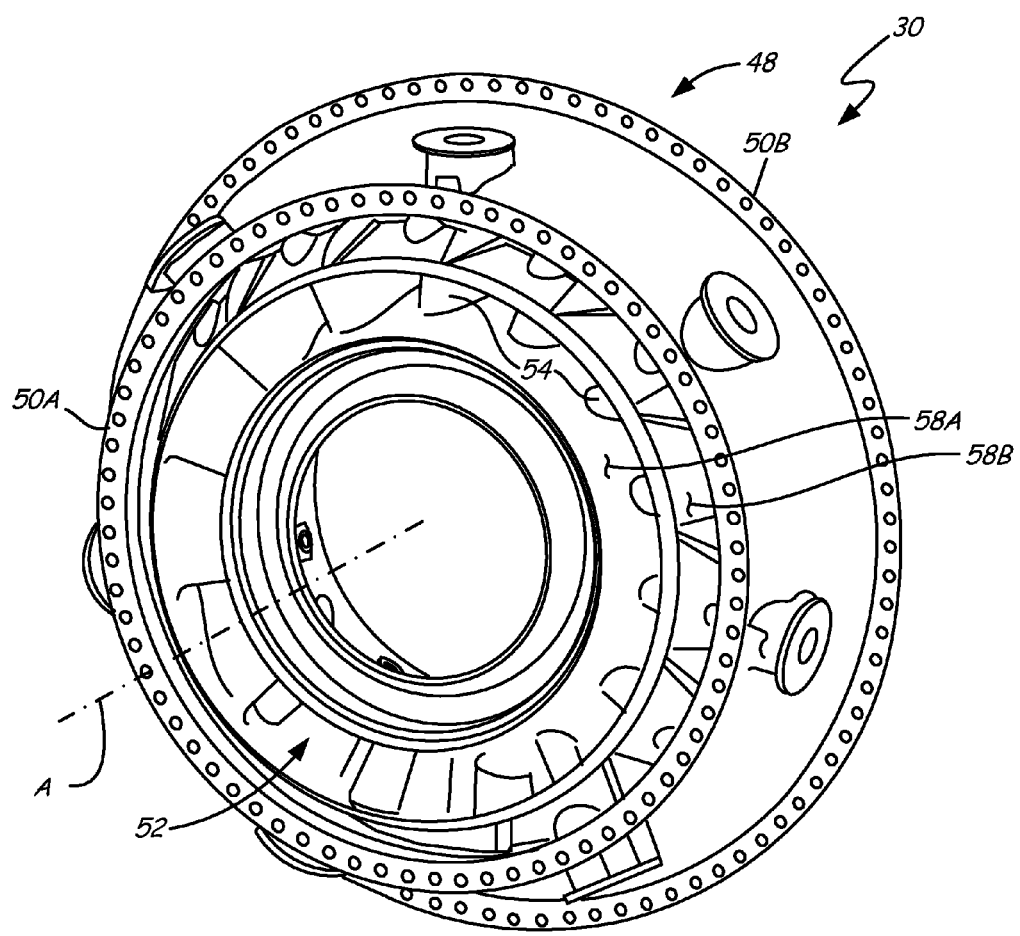
FIG. 2 isometrically depicts an example embodiment of a mid-turbine frame for a gas turbine engine.

FIG. 2 shows MTF 30, which includes an outer case assembly 48, outer case flanges 50A, 50B, inner case assembly 52 and vanes 54. Inner case assembly 52 includes inner liner 58A and outer liner 58B.

The example embodiment of MTF 30 has outer case assembly 48 disposed radially outward of inner case assembly 52 with respect to axis A of gas turbine engine 20 (FIG. 1). Inner case assembly 52 forms a flow path along which hot gases exiting the high pressure turbine 32 travel. Vanes 54 are disposed in and form this flow path through inner case assembly 52. Additionally, the flow path through inner case assembly 52 is formed by inner liner 58A at an inner radial extent (with respect to axis A) and by outer liner 58B at an outer radial extent (with respect to axis A).

Outer case assembly 48 has axially opposed outer case flanges 50A, 50B for mounting MTF 30 to adjacent engine component cases (e.g., cases of high pressure turbine 32, low pressure turbine 34). Outer case assembly 48 can also be radially secured to inner case assembly 52 to define an engine support frame. In one non-limiting example, a plurality of radially extending and circumferentially distributed load spokes (not visible in FIG. 2) structurally join outer case assembly 48 with inner case assembly 52.

Vanes 54 are illustrated as integrally formed between inner and outer liners 58A, 58B of inner case assembly 52. Inner and outer liners 58A and 58B act as walls to separate cold and hot gas flows through and around the MTF 30. In certain embodiments, vanes 54 can be removably secured to one or both liners 58A, 58B. As will be discussed subsequently, inner and outer liners 58A, 58B can be formed by segments, assembled and brazed. Additionally, the joints between the segments may include seals or other features to minimize leakage.

Figure 3:
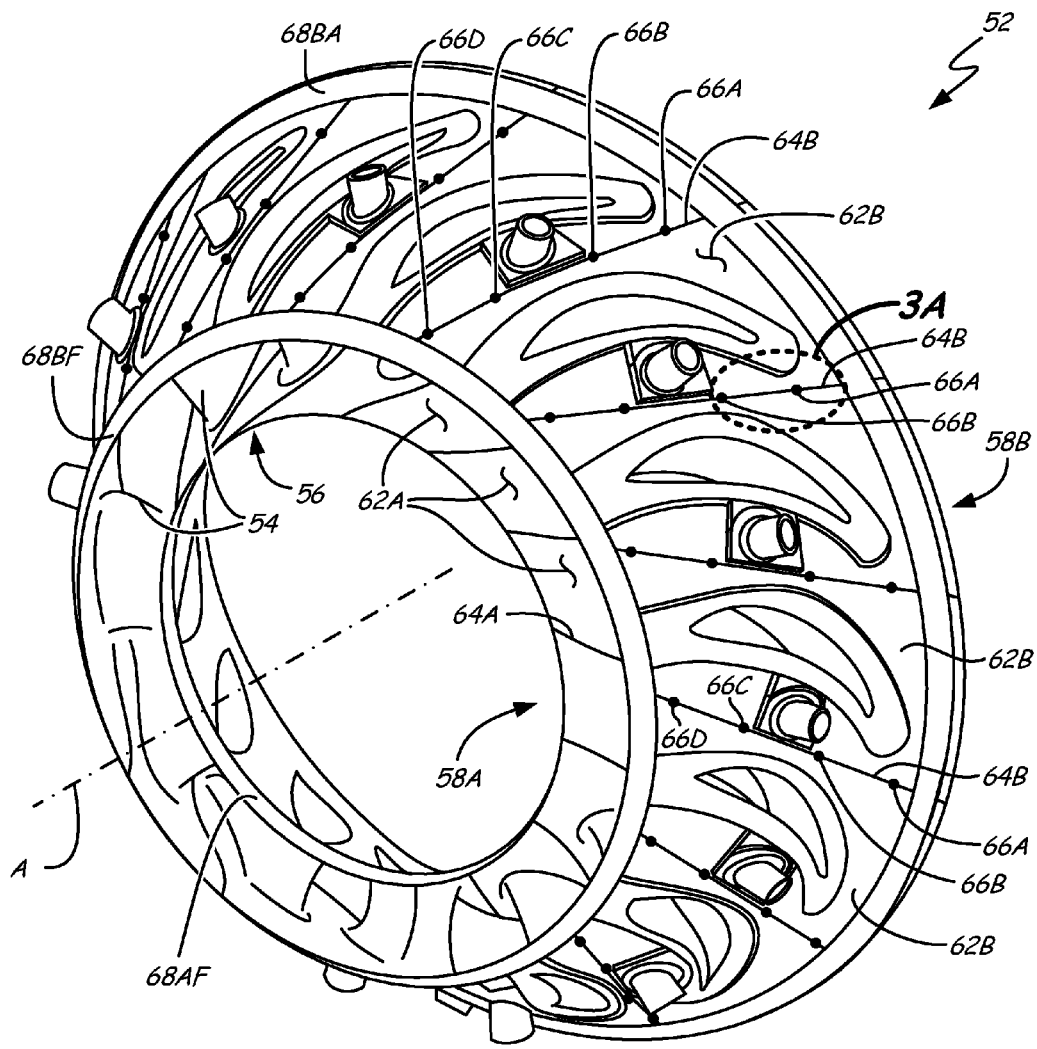
FIG. 3 isometrically depicts an example embodiment of an inner case assembly of the mid-turbine frame of FIG. 2.

FIG. 3 shows one embodiment of inner case assembly 52 with outer case 48 (FIG. 2) removed. As previously discussed, inner case assembly 52 is comprised of inner and outer liners 58A and 58B and vanes 54. Inner liner 58A includes inner liner segments 62A and inner braze joints 64A. Outer liner 58B includes outer liner segments 62B and outer braze joints 64B. Inner case assembly 52 additionally includes welds 66A, 66B, 66C, and 66D, forward inner diameter shear band 68AF, forward outer diameter shear band 68BF, and aft outer diameter shear band 68BA.

As will be discussed in further detail subsequently, inner liner 58A is formed from a plurality of separate inner liner segments 62A. Liner segments 62A are initially arranged adjacent one another and then filled and brazed together to form braze joints 64A of inner liner 58A. Similarly, outer liner 58B is formed from a plurality separate outer liner segments 62B that are arranged adjacent one another and then brazed together to form braze joints 64B of outer liner 58B.

Braze joints 64A and 64B have tack welds 66A, 66B, 66C, and 66D therealong (only welds along the outer circumference of outer liner 58B are visible in FIG. 3). Welds 66A, 66B, 66C, and 66D are disposed on non-flow path surfaces of liners 58A and 58B. Thus, welds 66A, 66B, 66C, and 66D are disposed on the outer surface of outer liner 58B and are disposed on the inner surface of inner liner 58A. Welds 66A, 66B, 66C, and 66D bridge the joint 64A between the adjacent liner segments 62A. Similarly, welds 66A, 66B, 66C, and 66D bridge the joint 64B between the adjacent liner segments 62B.

In the embodiment shown in FIG. 3, welds 66A, 66B, 66C, and 66D comprise several distinct circular shaped welds that are applied along each joint 64A and 64B and are spaced with respect to one another. In one embodiment, each weld 66A, 66B, 66C, and 66D extends to substantially overlap with adjacent segments such that each weld overlaps with both braze material (at braze joints 64A and 64B) and edge portions of adjacent segments. As will be discussed subsequently, welds 66A, 66B, 66C, and 66D have sufficient size and have a sufficient number to provide support to temporarily hold inner case assembly 52 together with a set substantially similar gap width at each braze joint 64A and 64B prior to brazing. In other embodiments, welds 66A, 66B, 66C, and 66D can have various shapes and sizes and may even comprise a single continuous weld at each joint 64A and 64B as criteria dictate.

Shear bands 68AF, 68BF, and 68BA (including inner diameter aft shear band (not shown)) are disposed at forward and aft ends of inner and outer liners 58A and 58B. Shear bands are brazed or otherwise affixed to the non-flow path side of liners 58A and 58B to provide structural strength to inner case assembly 52.

Figure 3A:
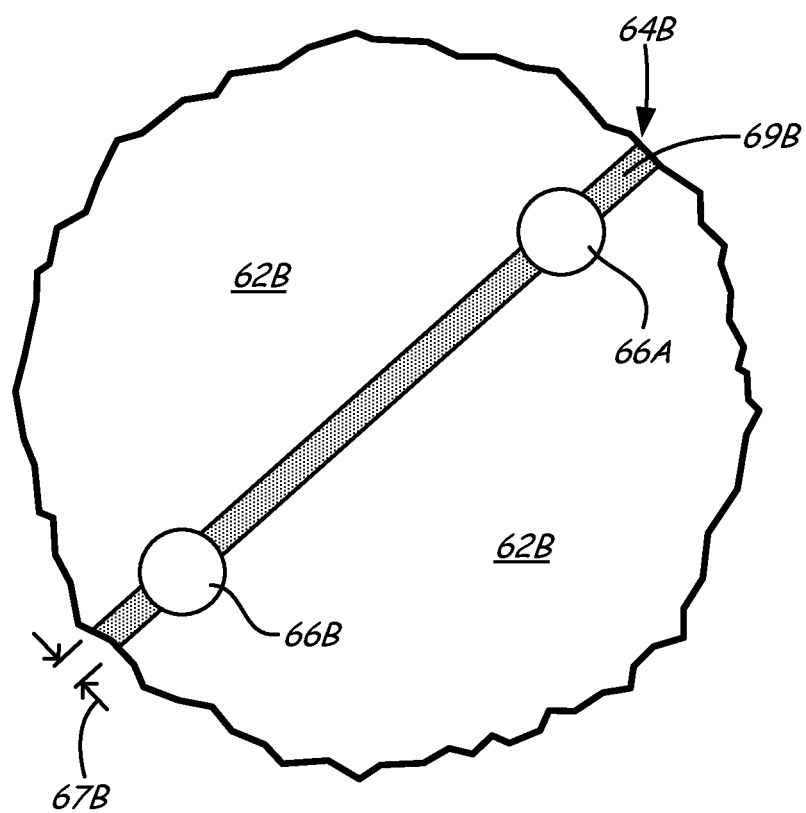
FIG. 3A is an enlarged view of the inner case assembly of FIG. 3.

FIG. 3A provides an enlarged view of outer liner 58B. FIG. 3A illustrates adjacent liner segments 62B and one braze joint 64B. Braze joint 64B encompasses a gap 67B between adjacent liner segments 62B that is filled with braze material 69B. As discussed previously, welds 66A and 66B extend to substantially overlap with adjacent liner segments 62B such that welds 66A and 66B extend across gap 67B and overlap with both braze material 69B (at braze joint 64B) and edge portions of adjacent segments 62B.

Figure 4A:
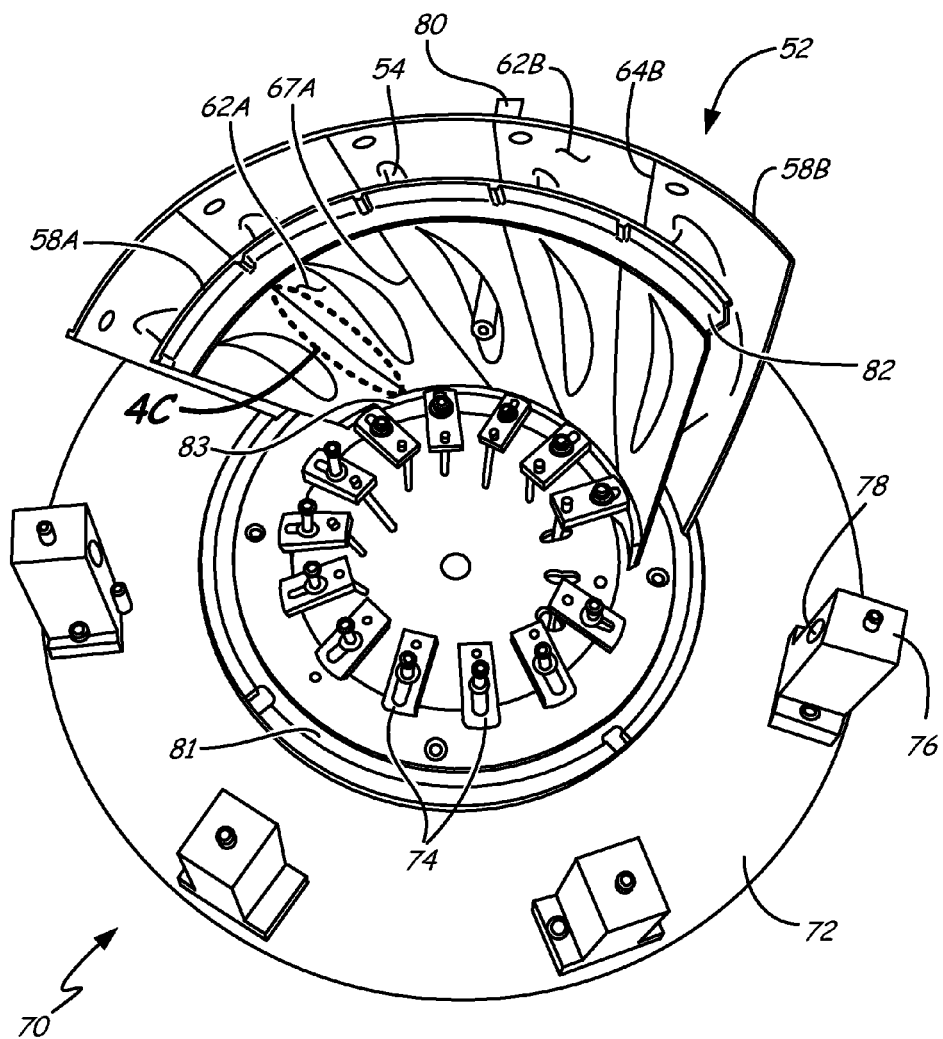
FIG. 4A is an elevated view of a portion of the inner case assembly of FIG. 3 is disposed in a fixture.
Figure 4B:
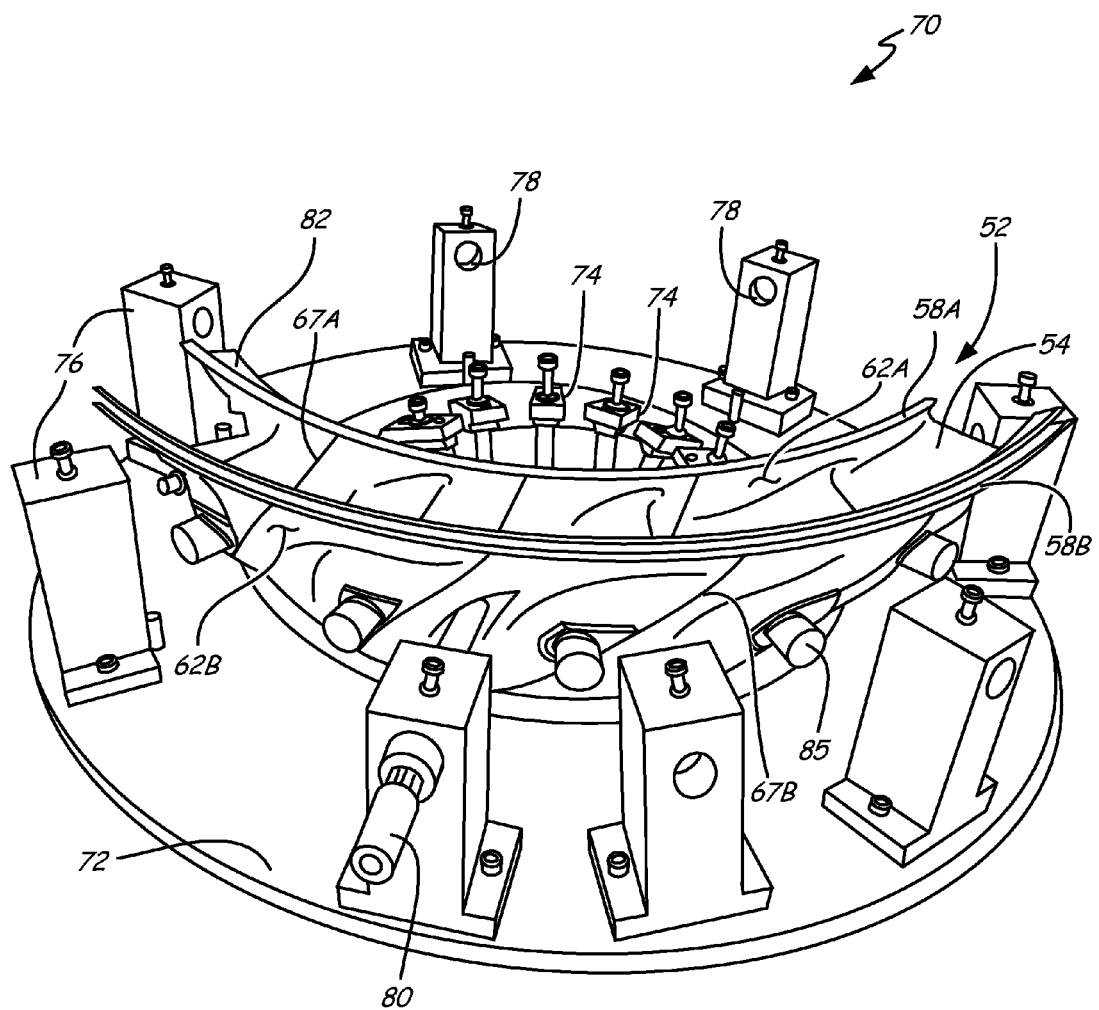
FIG. 4B is an elevated side perspective view of the inner case assembly and fixture of FIG. 4A.

FIGS. 4A and 4B show a partially assembled inner case assembly 52 prior to brazing and welding processes. Inner case assembly 52 includes inner and outer liners 58A and 58B, vanes 54, inner liner segments 62A, outer liner segments 62B, an inner diameter aft flange 82 and an inner diameter forward flange 83. FIGS. 4A and 4B additionally illustrate a fixture 70 that includes a base 72, inner diameter clamps 74, legs 76 with apertures 78, and a rod 80.

Prior to assembly as shown, vane assemblies can be formed, each vane assembly comprises a single vane 56 and single inner and outer liner segments 62A and 62B. Each vane assembly can be fabricated together using known techniques to connect the vane 54 to the liners 62A and 62B.

Vane assemblies are then arranged in sequence on base 72. Base 72 has a flat circular shape and is adapted with an arcuate channel 81 that receives the forward portion of each liner segment 62B therein. Inner diameter clamps 74 extend from base 72 and are adapted to be threaded down to contact and retain inner liner segments 62A via inner forward flange 83. Thus, each inner liner segment 62A has a corresponding clamp 74.

Legs 76 extend from base 72 and are disposed around the outer diameter of inner case assembly 52. Each leg 76 has aperture 78 therein that allows rod 80 to be extended from leg 76 to inner case assembly 52. In one embodiment, rod 80 is adapted to insert into hollow vane 54 of the first vane segment assembly clamped into fixture 70. Rod 80 is used to locate bushings 85 (FIG. 4B) for subsequent machining. Additional vane assemblies (each vane assembly comprising inner liner segment 62A, single vane 54, and outer liner segment 62B) of inner case assembly 52 are built out from first vane assembly with rod 80 until inner case assembly 52 is complete.

Fixture 70 allows inner liner segments 62A to be disposed adjacent inner liner segments 62A. Similarly, outer liner segments 62B are disposed adjacent outer liner segments 62B. Liner segments 62A interface with adjacent liner segments along gap 67A and liner segments 62B interface along gap 67B. As discussed, inner and outer liner segments 62A and 62B have gaps 67A and 67B (a circumferential spaced distance) therebetween prior to brazing.

Fixture 70 allows the circumferential spaced distance of gaps 67A and 67B to be controlled so as to be substantially similar. The substantially similar circumferential spaced distance of gaps 67A and 67B allows for a uniform application of braze with the result that braze joints 64A and braze joints 64B (FIGS. 3 and 3A) have a substantially similar circumferential spaced distance. Because braze joints 64A and 64B (FIGS. 3 and 3A) have a substantially similar circumferential spaced distance, braze joints 64A and 64B and liner segments 62A and 62B exhibit similar thermal growth and strength properties. In the embodiment shown in FIGS. 4A and 4B, gaps 67A between liner segments 62A have substantially the same circumferential spaced distance as gaps 67B between liner segments 62B. However, in other embodiments gaps 67A between liner segments 62A can differ in circumferential spaced distance from gaps 67B between liner segments 62B.

Figure 4C:
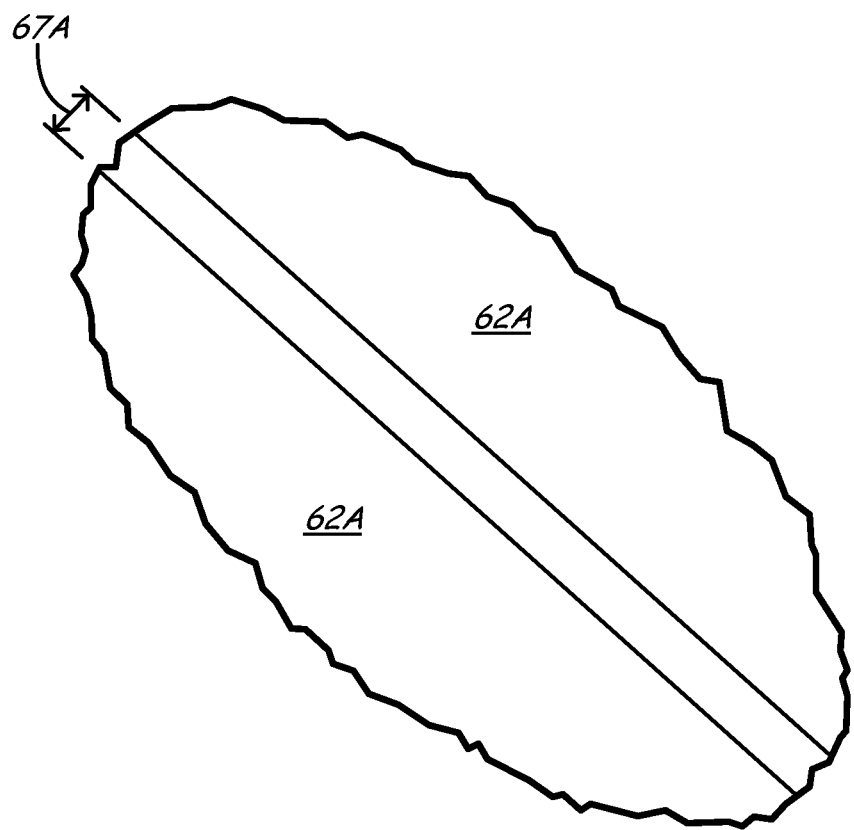
FIG. 4C is an enlarged view of a portion of the inner case assembly of FIG. 4A showing adjacent inner liner segments separated by a gap.

FIG. 4C provides an enlarged view of inner liner 58A. FIG. 4C illustrates adjacent inner liner segments 62A and one gap 67A between the edges of the adjacent inner liner segments 62A. As discussed previously, gap 67A comprises a circumferential spaced distance between adjacent inner liner segments 62A. Gap 67A between adjacent liner segments 62A is welded across and filled with braze material (not shown) in a subsequent manufacturing operations.

Figure 5:
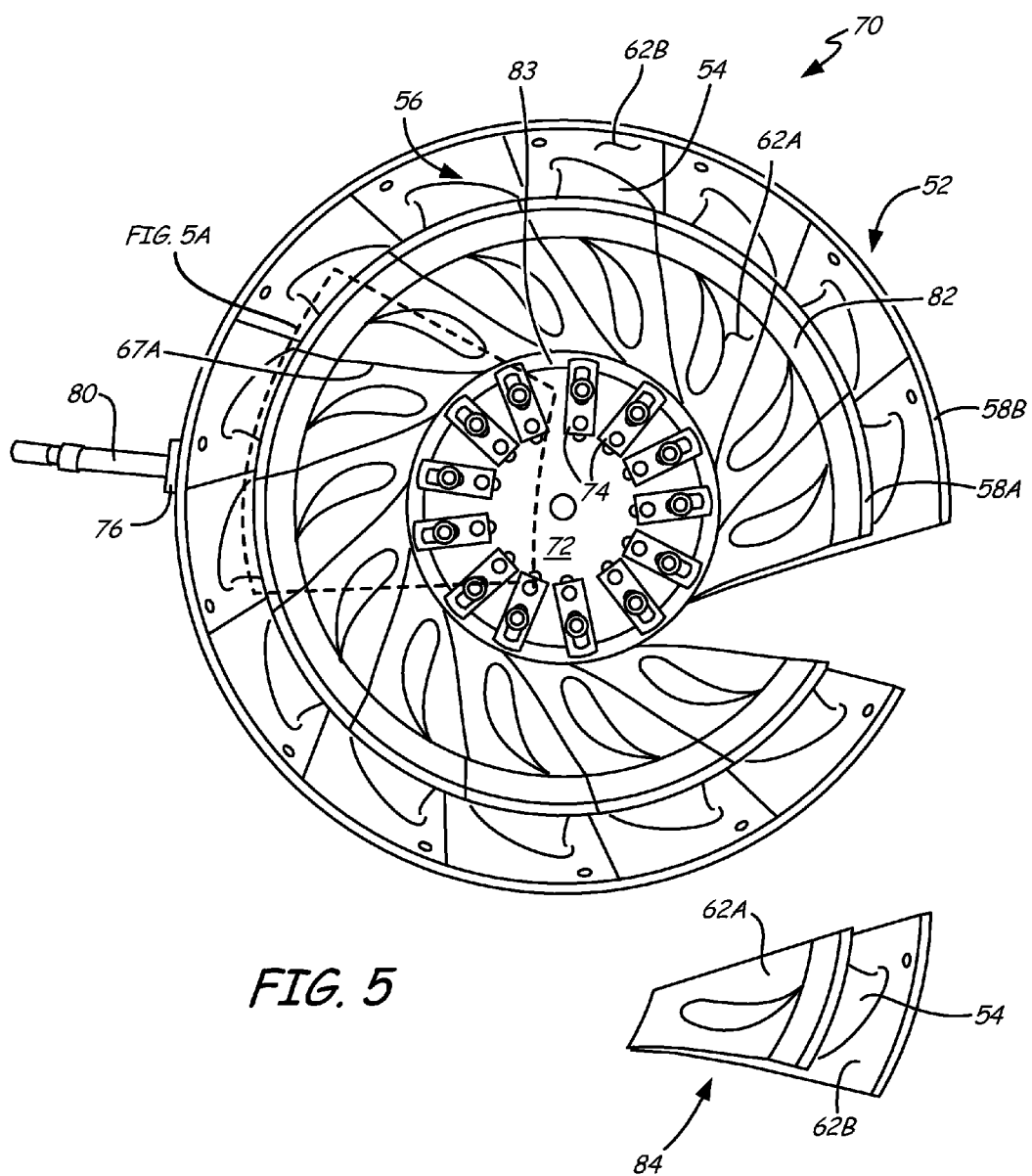
FIG. 5 is an elevated view of an assembled inner case assembly disposed in the fixture.
Figure 5A:
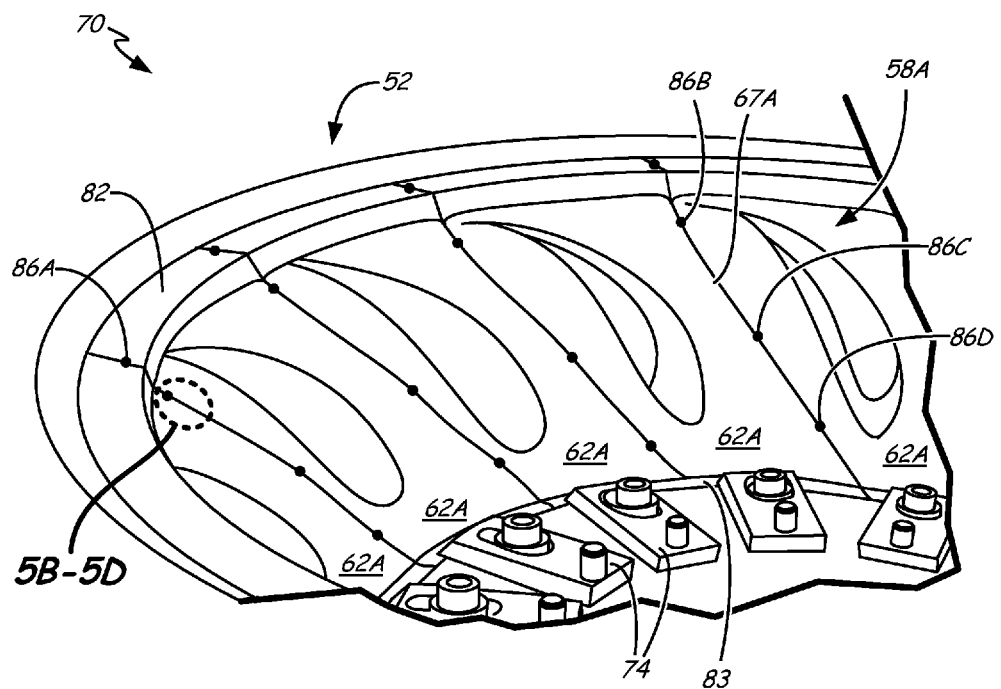
FIG. 5A is an enlarged perspective view of inner segments of the inner case assembly of FIG. 5.

FIG. 5 shows an almost assembled inner case assembly 52 prior to addition of a keystone vane assembly 84 and before brazing and welding processes. FIG. 5A shows a portion of inner liner 58A. FIGS. 5 and 5A show inner case assembly 52, which includes inner and outer liners 58A and 58B, vanes 54 (FIG. 5), inner liner segments 62A, outer liner segments 62B (FIG. 5), gaps 67A and 67B, inner diameter aft flange 82, and inner diameter forward flange 83. FIG. 5A additional illustrates indentations 86A, 86B, 86C, and 86D. FIGS. 5 and 5A show fixture 70 including base 72 (FIG. 5), inner diameter clamps 74, legs 76 (FIG. 5), and rod 80 (FIG. 5).

As shown in FIG. 5, vane assemblies (each comprising inner liner segment 62A, single vane 54, and outer liner segment 62B) of inner case assembly 52 are built out from first segment with rod 80 until inner case assembly 52 is complete. Keystone vane assembly 84 comprises the final vane assembly inserted to complete inner case assembly 52. As keystone vane assembly 84 is the final vane assembly inserted, inner liner segment 62A and outer liner segment 62B of keystone vane assembly 84 are sized to achieve substantially uniform gaps 67A and 67B between all liner segments 62A and 62B of inner case assembly 52. In many instances, achieving a uniform circumferential spaced distance between inner liner segment 62A and outer liner segment 62B of keystone vane assembly 84 and adjacent liner segments 62A and 62B involves increasing or decreasing the circumference of inner liner segment 62A and outer liner segment 62B of keystone vane assembly 84 relative to other liner segments 62A and 62B.

FIG. 5A shows indentations 86A, 86B, 86C, and 86D, which are inserted in braze joints 64A and braze joints 64B (not shown). Indentation 86A is placed in inner diameter aft flange 82 and indentations 86B, 86C, and 86D are inserted between adjacent liner segments 62A and 62B. Indentations 86A, 86B, 86C, and 86D are sized such that each indentation 86A, 86B, 86C, and 86D bridges the gap 67A between adjacent liner segments 62A and 62B (i.e., each indentation 86A, 86B, 86C, and 86D extends across gap 67A). Welds similar to welds 66A, 66B, 66C, and 66D of outer diameter flow liner 58B (FIG. 3) are applied in the weld indentations 86A, 86B, 86C, and 86D to temporarily hold inner case assembly 52 together prior to brazing.

Figure 5B:
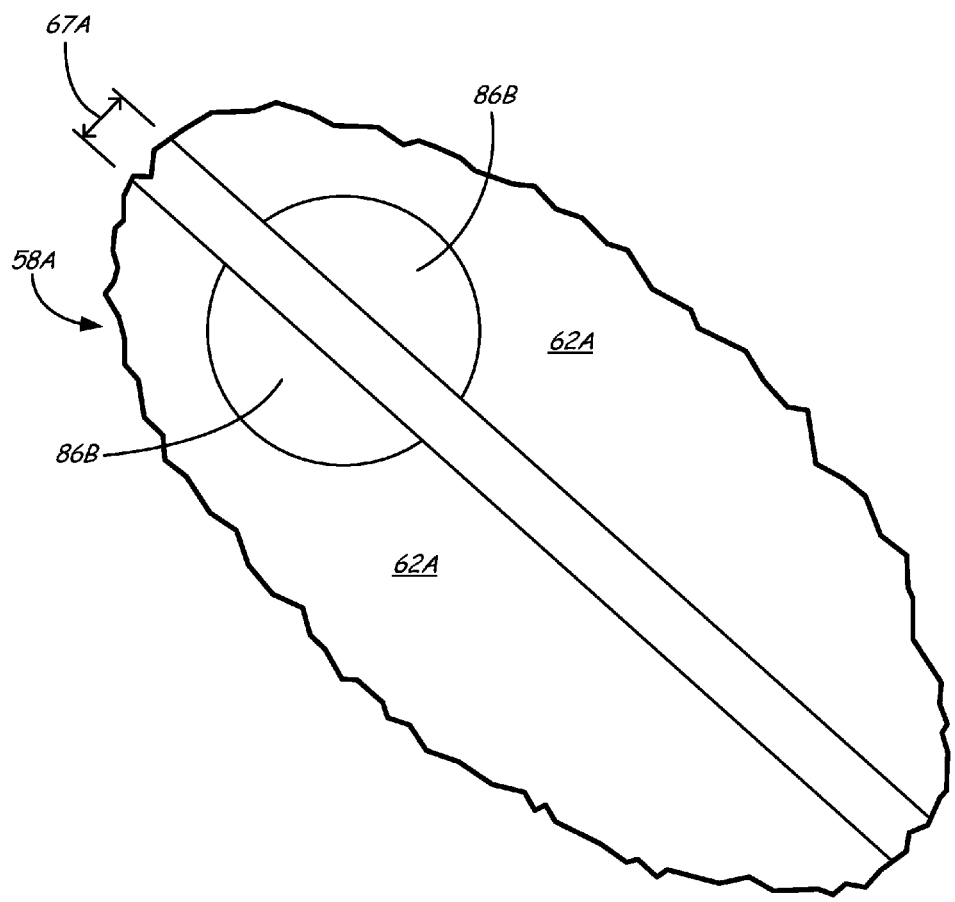
FIG. 5B is an enlarged view of the inner segments of FIG. 5A showing a gap therebetween.

FIG. 5B provides an enlarged view of inner liner 58A. FIG. 5B illustrates adjacent inner liner segments 62A and one gap 67A between the edges of the adjacent inner liner segments 62A. FIG. 5B additionally illustrates indention 86B which extends across (bridges) gap 67A onto both inner liner segments 62A to a substantially equal extent. As discussed previously, indention 86B is designed to be filled with weld material to temporarily hold inner liner segments 62A together prior to brazing.

Figure 5C:
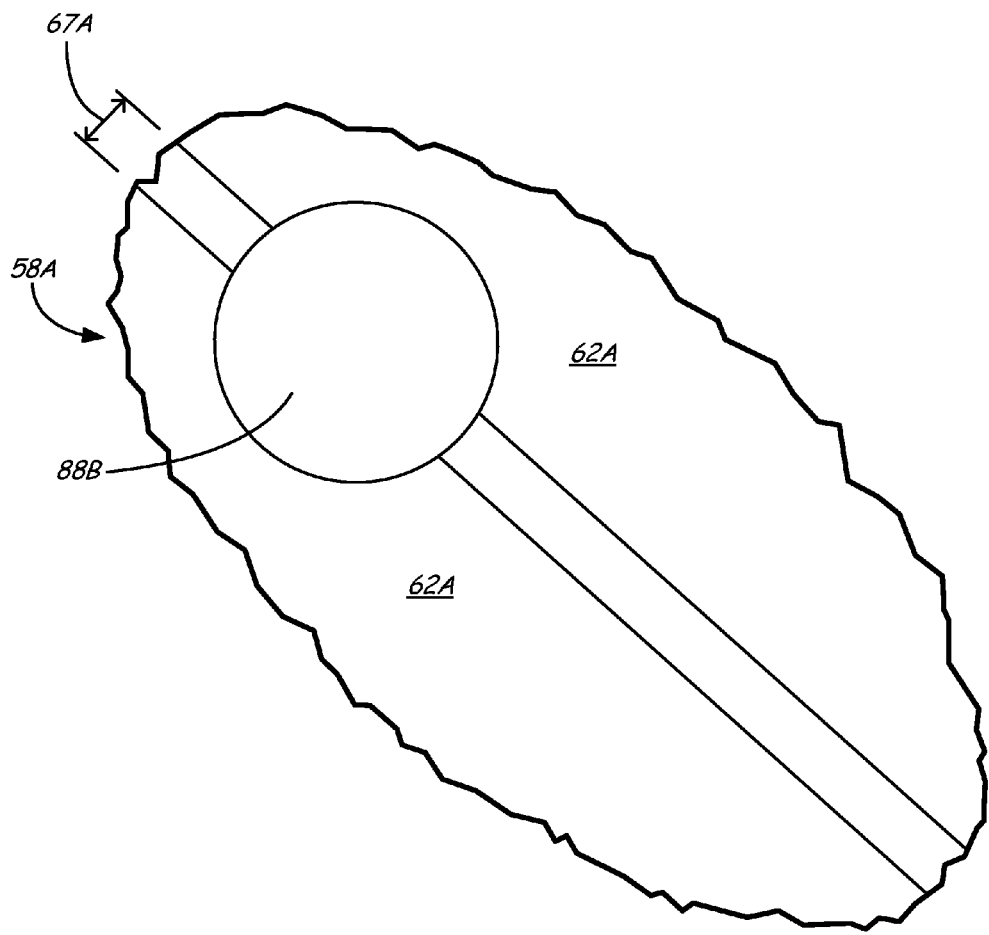
FIG. 5C is an enlarged view of the inner segments of FIG. 5A showing the gap therebetween and a weld across the gap.

FIG. 5C shows an enlarged view of inner liner 58A with weld 88B now applied to indention 86B (FIG. 5B). Weld 88B substantially fills indention 86B (FIG. 5B) and therefore extends across gap 67A onto adjacent inner liner segments 62A. Thus, as with indention 86B weld 88B bridges gap 67A between liner segments 62A. Weld 88B temporarily holds inner liner segments 62A together prior to brazing.

Figure 5D:
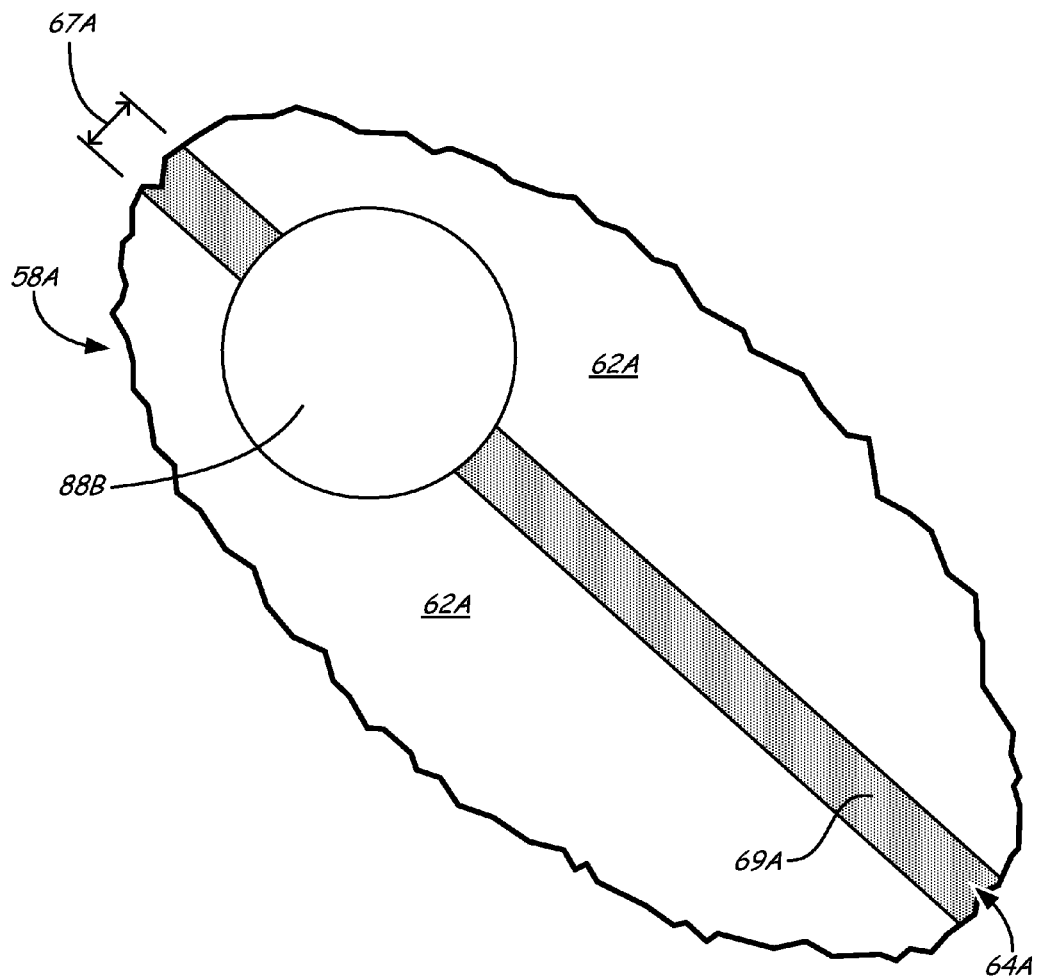
FIG. 5D is an enlarged view of the inner segments of FIG. 5A showing the gap filled with a braze material to form a braze joint.

FIG. 5D shows an enlarged view of inner liner 58A with weld 88B and braze material 69A applied to gap 67A to form braze joint 64A. As with FIGS. 5B and 5C, FIG. 5D illustrates adjacent liner segments 62A and one braze joint 64A therebetween. Braze joint 64A encompasses gap 67A, which is filled with braze material 69A. As discussed previously, weld 88B extends across gap 67A to substantially overlap with adjacent liner segments 62B. Thus, weld 88B overlaps with both braze material 69A (at braze joint 64B) and edge portions of adjacent segments 62B.

Figure 6:
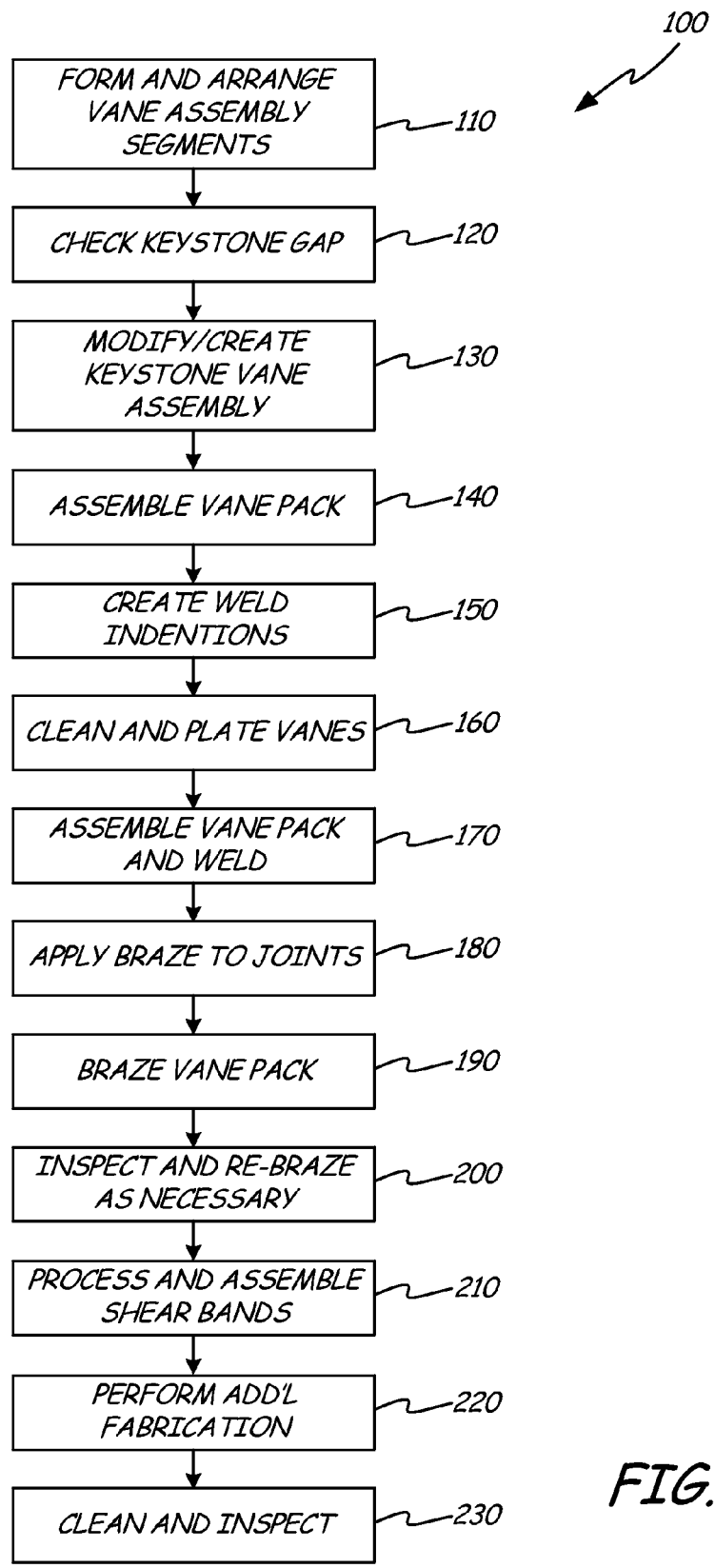
FIG. 6 is a flow diagram of a method of forming an inner case assembly.

FIG. 6 illustrates an exemplary method of forming inner case assembly 52. Method 100 proceeds from step 110 where vane assembly segments are fabricated using known techniques such as brazing, welding, forging or other techniques. Fabrication of vane assembly segments can additionally include various machining processes on surfaces of vanes 54. Vane assembly segments are then assembled adjacent one another in fixture 70 as described previously to form inner case assembly 52 with substantially similarly circumferential gap distances (gap widths). In step 120, the circumferential width of keystone vane assembly segment 84 is ascertained. Keystone vane assembly segment 84 can be created and/or modified using standard fabrication or machining techniques in step 130. At step 140, keystone vane assembly segment 84 is then inserted to form the full inner case assembly 52 in order to achieve substantially similar gap widths between all liner segments 62A and 62B. Weld indentations 86A, 86B, 86C, and 86D can be disposed along braze joints 64A and 64B of inner and outer liners 58A and 58B at step 150. Inner case assembly 52 can be then be disassembled and cleaned. Various components including vanes 54 of inner case assembly 52 can also be plated in step 160. Inner case assembly 52 can then be reassembled with substantially similarly circumferential gap distances and welded to temporarily hold the assembled plurality of liner segments 62A and 62B together prior to brazing at step 170. At step 180, braze material is applied to gaps and forms braze joints 64A and 64B. Braze material can be provided in a variety of media, such as powders, dispersions, slurries, pastes, foils, and tapes. The entire inner case assembly 52 is then removed from fixture 70 and brazed by heating (e.g., furnace heating) inner case assembly 52 to a suitable temperature, and for a suitable duration, to interdiffuse at least a portion of the brazing material with the material of liner segments 62A and 62B to form braze joints 64A and 64B. Suitable temperatures and durations for fusing the braze material to liner segments 62A and 62B generally depends on the brazing material and the material of liner segments 62A and 62B.

After brazing is complete inner case assembly 52 can be inspected and re-brazed as needed at step 200. At step 210, shear bands 68AF, 68BF, and 68BA can be turned, milled, and otherwise finished and assembled by brazing or other methods to inner case assembly 52. Additional steps such as milling bosses, drilling and reaming bushing holes, and installing bushings can additionally be performed at step 220. In step 230, inner case assembly 52 is inspected and cleaned.

The invention relates to a case assembly and process for assembling a case of a gas turbine engine. In particular, the invention described allows for a substantially uniform case assembly to be readily formed prior to brazing operations, thereby reducing the time, complexity, and cost of performing the brazing operations during manufacturing. The case assembly utilizes liner segments that are disposed adjacent one another. Initially, each of the liner segments is separated from adjacent liner segments by gaps to either circumferential side. Each gap between the adjacent liner segments has a substantially similar gap width, which allows braze to be applied with substantially the same width for each joint. Because the joints have a substantially similar circumferential spaced distance, the joints and liner segments have similar thermal growth and strength properties. Additionally, the invention simplifies the assembly process by utilizing welds to temporarily hold the assembled liner segments together at the joints to maintain the gaps prior to brazing.

Discussion of Possible Embodiments

The following are non-exclusive descriptions of possible embodiments of the present invention.

A case assembly includes a plurality of segments, at least one braze joint, and one or more welds. The braze joint connects the plurality of segments together and the one or more welds extend across adjacent segments.

The case assembly of the preceding paragraph can optionally include, additionally and/or alternatively, any one or more of the following features, configurations and/or additional components:

the welds are applied to the adjacent segments prior to having the plurality of segments brazed together;

the weld is applied to forward and aft flanges of the liner;

each braze joint has a substantially similar circumferential spaced distance, and wherein one of the segments comprises a keystone segment that has a circumferential spaced distance that differs from the circumferential spaced distances of the remainder of the segments;

the segments form an inner liner for a mid-turbine frame;

the segments form an outer liner for a mid-turbine frame; and the one or more welds comprise a plurality of welds that are applied along a non-flow path surface of each braze joint and are spaced with respect to one another, and wherein each of the plurality of welds extend to substantially overlap with the adjacent segments such that the weld overlaps with both the braze joint and a portion of the adjacent segments.

A method of assembling a case of a gas turbine engine includes assembling a plurality of segments, where each of the segments separated from an adjacent segment by a gap. The method applies a weld between segments across the gap and applies a braze material to the gap.

The method of the preceding paragraph can optionally include, additionally and/or alternatively, any one or more of the following features, configurations and/or additional components:

applying a plurality of indentations to the liner segments such that each indentation bridges the gap between adjacent liner segments and applying the weld to the indentations to temporarily hold the assembled plurality of liner segments together prior to brazing;

each gap between the adjacent liner segments comprises a circumferential gap width;

each gap between the adjacent liner segments has a substantially similar circumferential spaced distance;

measuring the gaps between the keystone vane assembly and adjacent liner segments, and fabricating the keystone vane assembly to a desired circumferential width such that the gaps between all of the liner segments have the substantially similar circumferential spaced distance;

wherein the keystone vane assembly comprises the last liner segment assembled in the plurality of liner segments;

assembling shear bands to a forward and an aft portion of the case;

wherein the liner segments form an inner liner for a mid-turbine frame; and wherein the liner segments form an outer liner for a mid-turbine frame.

A fixture includes a base, a plurality of clamps, a plurality of legs, and one or more rods. The base has a arcuate channel therein and the clamps extend from the base around the channel. The legs extend from the base and are spaced at a distance from the clamps. The one or more rods are mounted to the legs.

The fixture of the preceding paragraph can optionally include, additionally and/or alternatively, any one or more of the following features, configurations and/or additional components:

the channel is adapted to receive a forward portion of a case assembly therein;

the channel allows segments of the case assembly to be disposed adjacent another around a circumference of the channel;

a case assembly mounted within the fixture, wherein the rod extends through a hollow vane of the case assembly to locate bushings of the case assembly; and each clamp corresponds to a segment of a case assembly While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A case assembly of a gas turbine engine comprising:
a plurality of segments, wherein each segment is circumferentially spaced from an adjacent segment to form a gap;
at least one braze joint connecting the plurality of segments together at the gap; and
one or more welds extending across the gap to join adjacent segments, wherein each of the one or more welds overlaps with both the braze joint and a portion of each of the adjacent segments.

2. The case assembly of claim 1, wherein the welds are positioned along the braze joint.

3. The case assembly of claim 1, and further comprising forward and aft flanges, and wherein the weld is applied to the forward and the aft flanges of the case assembly.

4. The case assembly of claim 1, wherein the braze joint comprises a plurality of braze joints, the plurality of braze joints all have a substantially similar circumferential spaced distance, and wherein one of the segments comprises a keystone segment that has a circumferential spaced distance that differs from the circumferential spaced distances of the remainder of the segments.

5. The case assembly of claim 1, wherein the segments form an inner liner for a mid-turbine frame.

6. The case assembly of claim 1, wherein the segments form an outer liner for a mid-turbine frame.

7. The case assembly of claim 1, wherein the one or more welds comprise a plurality of welds that are applied along a non-flow path surface of each braze joint and are spaced with respect to one another.

8. A method of assembling a case of a gas turbine engine, the method comprising:

assembling a plurality of segments, each of the segments circumferentially spaced from an adjacent segment by a gap comprising a circumferentially spaced distance;

applying a weld between segments across the gap;

applying a braze material to the gap, wherein the weld extends to overlap with both the braze joint and a portion of each of the adjacent segments; and brazing to produce a braze joint that fills the gap between segments.

9. The method of claim 8, further comprising:

applying a plurality of indentations to the segments such that each indentation bridges the gap between the adjacent segments; and applying the weld to the indentations to temporarily hold the assembled plurality of segments together prior to brazing.

10. The method of claim 8, wherein each gap between the adjacent segments has a substantially similar gap width.

11. The method of claim 10, wherein the step of assembling a plurality of segments includes:

measuring the gap width to determine a desired circumference of a segment for a keystone vane assembly;

fabricating the segment for the keystone vane assembly to the desired circumference such that all the gaps between all of the segments have the substantially similar gap width; and inserting the keystone vane assembly into the assembly.

12. The method of claim 11, wherein the segment for the keystone vane assembly comprises a last segment assembled.

13. The method of claim 8, further comprising assembling shear bands to a forward and an aft portion of the case.

14. The method of claim 8, wherein the segments form at least one of an inner liner and/or an outer liner for a mid-turbine frame.

* * * * *